United States Patent

[11] 3,594,590

[72] Inventor Kirk W. Smith
West Acton, Mass.
[21] Appl. No. 782,305
[22] Filed Dec. 9, 1968
[45] Patented July 20, 1971
[73] Assignee The United States of America as represented by the Secretary of the Navy

[54] MEMORY SENSE AMPLIFIER
4 Claims, 4 Drawing Figs.

[52] U.S. Cl. 307/243, 307/254, 328/154, 330/30 R
[51] Int. Cl. H03k 17/60
[50] Field of Search 330/30, 30 D, 69; 328/104, 154; 307/243

[56] References Cited
UNITED STATES PATENTS

| | | | |
|---|---|---|---|
| 2,572,792 | 10/1951 | White | 328/154 |
| 2,867,723 | 1/1959 | Spaulding | 328/154 X |
| 3,241,078 | 3/1966 | Jones | 330/30 X |
| 3,452,289 | 6/1969 | Ryan | 330/30 X |
| 3,454,893 | 7/1969 | Goordman | 330/30 |
| 3,478,283 | 11/1969 | Simon et al. | 330/30 UX |

OTHER REFERENCES

McDonald, " Electronic Switching For Class A Signals," IBM TECHNICAL DISCLOSURE BULLETIN, Vol. 9, No. 6 November 1966 pp. 727;728 307-243

*Primary Examiner*—Roy Lake
*Assistant Examiner*—James B. Mullins
*Attorneys*—R. I. Tompkins, L. I. Shrago and R. K. Tendler

ABSTRACT: A multiple channel gated computer memory sense amplifier is provided having a multiplicity of inputs which are amplified by a multiplicity of preamplifiers in a predetermined timed sequence prior to linear amplification and buffering. The amplifier is gated in its preamplifier unit such time as the preamplifier is to be rendered operative. Switching transients are eliminated by providing a bridge circuit to carry the biasing current when the preamplifiers are in standby condition.

Kirk W. Smith
INVENTOR.

BY RK Tendler, Agent
Attorney

Kirk W. Smith
INVENTOR.

MEMORY SENSE AMPLIFIER

The invention described herein may be manufactured and used by or for the Government of the United States of America for governmental purposes without the payment of any royalties thereon or therefor.

This invention relates to computer memory sense amplifiers and, more particularly, to a dual channel amplifying circuit in which the inputs to each channel are gated prior to amplification.

The information stored in advanced computer memory stacks is frequently stored at low voltage and current levels. This information must be sensed and amplified to a useful level usually called "logic level" so that it can be utilized by the arithmetic unit of the computer. One method of performing this detection and amplification is simply to provide amplifiers and buffers for each element in the memory. This is a satisfactory solution for small memory systems. For large memory systems, cost as well as packaging restraints make this approach impractical. In large memory systems, it may be advantageous to share an amplifier between several memory elements. This is accomplished by switching the outputs from several elements of the memory stack into a single amplifying stage. However, switching prior to amplification suffers most seriously from transient voltage and currents introduced by the switching operation. Because the voltages and currents in the memory stack are frequently an order of magnitude less than the switching transients, switching prior to amplification often obscures and degrades the information in the memory.

Another problem encountered in the design of sense amplifiers is the necessity of protecting them from the overload occurring when information is written into the memory. Frequently, the voltages and currents used to write information into the memory are orders of magnitude greater than the detected signal. This causes overload of the sense amplifier unless the amplifier is placed in a standby mode during the write-in operation. Switching to a standby mode also introduces undesirable transients.

Both the transient switching problem and the overload problem are solved by the subject invention which is a dual channel gated sense amplifier with two separate wide band differential preamplifiers designed to detect bipolar signals from either of two pairs of inputs. The outputs of these preamplifiers are fed in parallel to a subsequent amplification stage which produces an amplified output corresponding to one or the other of the two input signals. Electrical control signals determine which of the two input signals will be amplified at a given time.

This memory sense circuit overcomes the aforementioned transient and overload problems by switching a constant bias current between each of two preamplifiers to gate them on and off. When one of the preamplifiers is turned on by supplying the requisite bias, it transmits the signal from the computer memory to a linear amplification stage. The bias supplies of each of these preamplifiers share a balance resistance bridge to carry the semiconductor biasing current during the standby and transient portions of their switching cycles. The use of this bridge prevents the buildup of transient voltages or current irregularities in the semiconductor power supply during the switching operation and significantly increases the signal-to-noise ratio of the circuit.

In the subject circuit, input signals from two pairs of input lines are fed to two preamplifiers which in turn feed a linear amplification stage in parallel. These preamplifiers are sequentially switched from standby to their active modes by activation of their bias supplies. Each preamplifier thus feeds alternately amplified signals from preselected elements in the computer memory to a linear amplifier. The linear amplifier is AC coupled to a buffer amplifier for further amplification and pulse shaping of the sensed signals. The input to this buffer stage is shunted to ground between each switching operation to prevent charge buildup across the coupling capacitors. The output of the buffer stage is subsequently subjected to strobe sampling and this sampled signal stored in the conventional arithmetic unit of a computer.

It is therefore an object of this invention to provide a multiple channel gated sense amplifier having a multiplicity of inputs which are preamplified in a predetermined timed sequence prior to linear amplification and further signal processing.

It is another object of this invention to provide a method for switching the output signals from elements in a computer memory prior to amplification thereof.

It is a further object of this invention to provide a resistance bridge biasing circuit for preamplifiers in a multichannel computer memory sense amplifying circuit.

Other objects, advantages and novel features of the invention will become apparent from the following detailed description thereof when considered in conjunction with the accompanying drawings in which like numerals represent like parts throughout and wherein.

Figure 1:
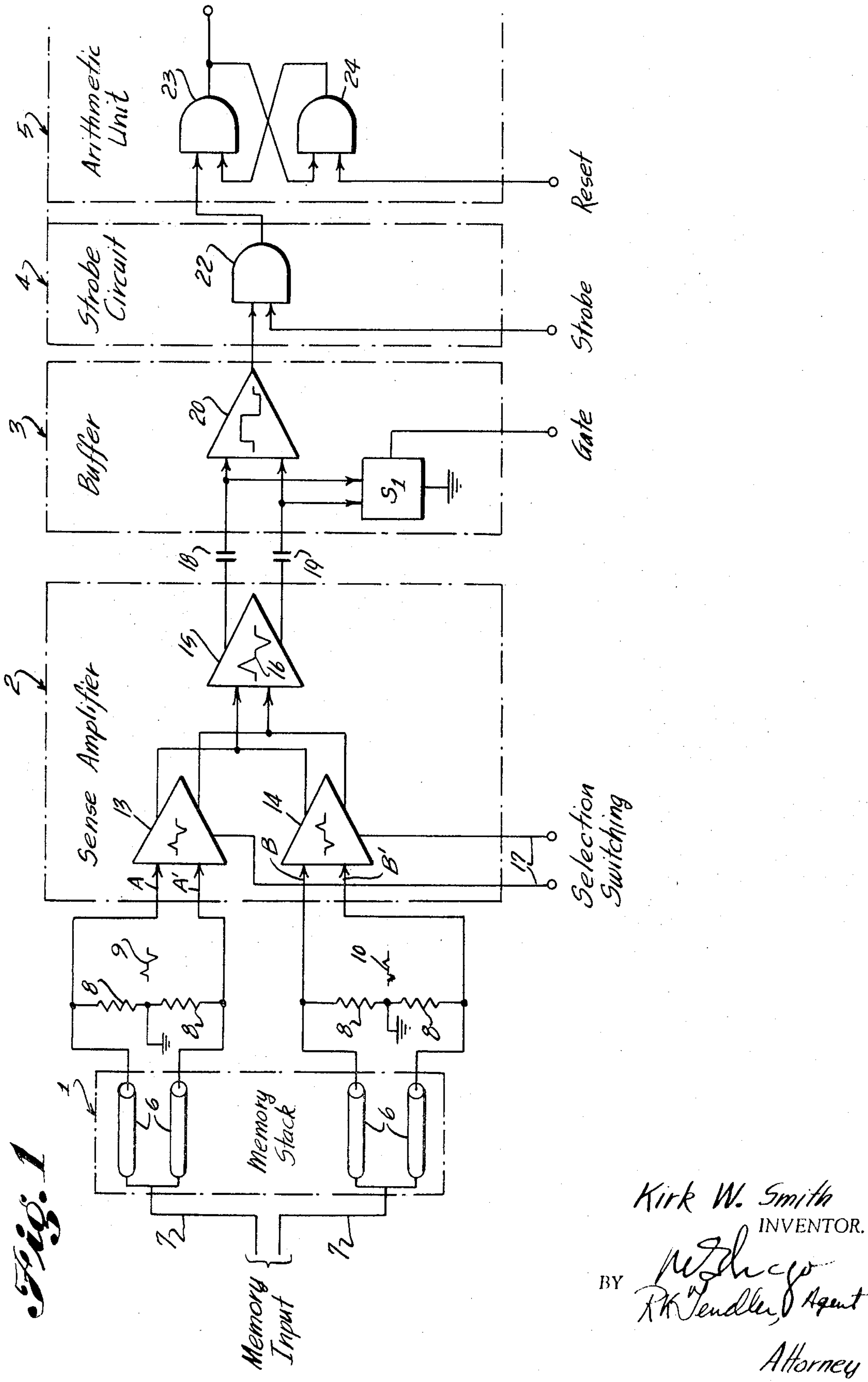
FIG. 1 is a block diagram of the computer memory sense amplifier showing a plated wire memory stack feeding the amplifier.

Referring to FIG. 1, a block diagram is shown of computer memory stack 1, sense amplifier 2 which detects and amplifies the signals written into the memory, a buffer stage 3 which shapes and amplifies the amplified signal, a strobe circuit 4 for sampling the buffer signal at a predetermined time and a portion 5 of the arithmetic unit of a computer.

The memory stack shown represents a plated wire memory stack. Information is stored in this stack as the resultant vector of two rectilinearly oriented currents. These two currents impress a resultant vector onto the individual elements 6 of the stack. Only the longitudinal inputs 7 to the stack are shown in FIG. 1. While plated wire memories are more radiation resistant than other types of memories, allowing their use in space environments, their outputs are an order of magnitude weaker than current magnetic core memories. The outputs of the plated wire memory must therefore be reliably amplified to logic level. This is accomplished by the subject sense amplifier.

After a word has been written into the memory stack by producing the aforementioned currents across load resistors 8, the unamplified signal appears as double spiked patterns 9 and 10 at the input to the sense amplifier. These signals are shown to be bipolar. It will be appreciated that any set of bipolar signals may be utilized as the inputs to the sense amplifier.

The sense amplifier is shown having two sets of inputs A, A′ and B,B′. These inputs appear at the input terminals of two preamplifiers 13 and 14. The preamplifiers feed a differential amplifier 15 in parallel. In the operation of the sense amplifier, only one of the preamplifiers is supplied with the requisite bias at a time. The length of time that the requisite bias is supplied depends upon the use to which the computer is put. In certain applications a regular sampling of the elements in the computer is desirable. In this case, first one and then the other of the preamplifiers may be activated on a time-shared basis. In other applications, only one of the preamplifiers need be placed in its operational mode. If in the dual channel case only half of the memory need be used in a particular application, only one of the two preamplifiers need ever be activated. It will be appreciated that in some applications one preamplifier may be activated for a longer period of time than the other. The activation of the channels represented by the preamplifiers is made flexible to accommodate these different applications and may in most cases be performed by conventional electronic switching circuits whose speed is commensurate with the requirements of the other units of the computer.

This bias switching is accomplished through the use of selection switching lines 17. In addition, lines 17 can place each of the preamplifiers in their standby modes during the time when information is being written into the computer memory, thus preventing overload of the preamplifiers. The method of introducing the bias to the preamplifiers without introducing switching transients will be described in FIGS. 2, 3 and 4.

The importance of eliminating these transients can best be understood in conjunction with the plated wire memory. Because of the relatively weak output of this type of memory, switching transients may be an order of magnitude stronger than the input signals to the sense amplifier. Only by eliminating these transients can the plated memory be made to operate at the necessary speed.

Theoretically, any number of preamplifiers could feed amplifier 15 in parallel. Because of bandwidth requirements, however, maximum efficiency is achieved with two preamplification stages. This effectively reduces the number of elements in the memory sense amplification stages by one-half without reduction in reliability or signal-to-noise ratio.

In FIG. 1, the output of preamplifier 13 is shown in its amplified form by pattern 16. The output of amplifier 15 is AC coupled to buffer stage 3 by capacitors 18 and 19. The AC coupling is provided to minimize the effects of component drift and radiation damage to the semiconducting devices which may occur in mobile or space applications. The buffer amplifier 20 shapes the spiked pulse from amplifier 15, effectively stretching the leading spike and minimizing the trailing spike. If this pulse is sampled in the middle of its stretched portion, a bipolar condition can be sensed. The inputs to the buffer are shunted to ground after every switching operation by gated switch $S_1$ to remove any charge built up across the coupling capacitance from previous sampling operations.

The output of buffer 20 is gated at 22 in response to a strobe pulse which corresponds to the aforementioned center of the leading stretched spike. The output of gate 22 will, therefore, be a logic level pulse, usually 3 volts or 0 volts depending on the state of the elements in the stack which are being sensed. The pulses are introduced to the arithmetic unit of the computer by the flip-flop shown by gates 23 and 24.

Providing a gated input stage in the preamplifier allows the detection of 4 mv. signals with an overall propagation delay of 30 nanoseconds across the sense amplifier and buffer stages. Total switching between the two channels can be achieved in less than 100 nanoseconds with a differential voltage gain of 120 and a 25 nanosecond rise time.

It will be appreciated that the sense amplifier, buffer, strobe stage and flip-flop can be fabricated in one package and thus constitute a complete memory sense amplifier. Likewise, each of the above components can be fabricated separately. Fabricating the sense amplifier and buffer stage in one package conveniently allows the interconnection of the buffer gate and the preamplifier switching lines to provide for the necessary synchronism between the two stages. The elimination of the switching transients is, however, accomplished primarily by the sense amplifier shown encompassed by dotted line 2 and it is to this configuration that the remainder of the specification is directed.

Figure 2:
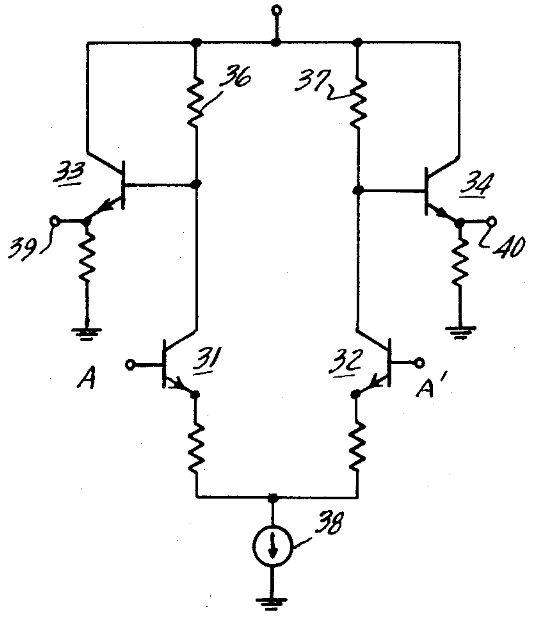
FIG. 2 is a schematic diagram of a differential amplifier.
Figure 3:
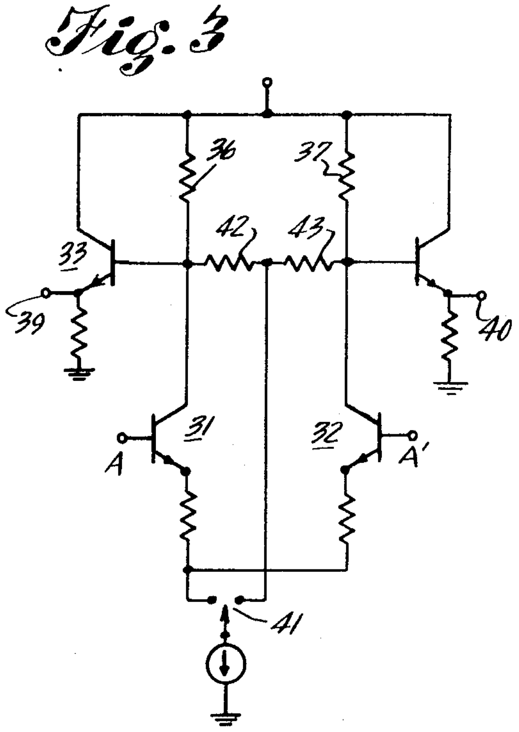
FIG. 3 is a schematic diagram of this amplifier modified for use as the preamplification and linear amplification stage of the memory sense amplifier.
Figure 4:
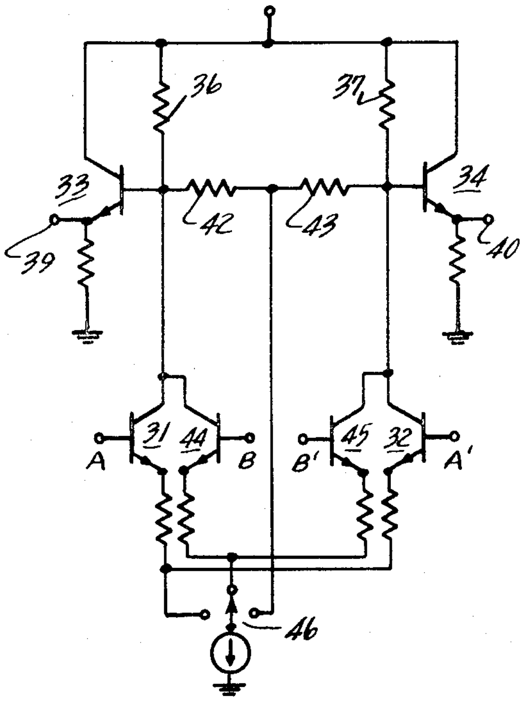
FIG. 4 is a schematic diagram of this modified amplifier showing a switching arrangement and additional preamplification transistors to accommodate a second series of input signals.

FIGS. 2, 3 and 4 refer to the preamplification and linear amplification stages of the sense amplifier shown in dotted box 2 of FIG. 1. This entire stage is fabricated as one thin-film module. A conventional single channel differential amplifier is shown in FIG. 2. It is typically composed of a preamplifier having transistors 31 and 32 providing a balanced input to a linear amplifier composed of transistors 33 and 34. Bias current for the preamplifier is supplied through resistors 36 and 37, the current flowing the direction of arrow 38. Inputs to the preamplification stage are labeled A and A'. Outputs of the linear amplifier are denoted by 39 and 40. Typical biasing requirements of such a conventional differential amplifier range from one of three Ma. per transistor. In order to place the preamplifier in a standby mode without introducing transients into the output of the linear amplifier, the bias supply is provided with two additional resistors 42 and 43 to form a bridge circuit. THis addition is shown in FIG. 3. As long as the values of 36 and 42 match those of 37 and 43, their values are not critical. During standby operation the bias supply is shunted to ground through the bridge by switch 41. This provides the amplifier power supply with a constant load during the standby period. Since the same current will flow through resistors 36 and 37 when the amplifier is in standby operation, as when the amplifier is in its amplifying mode, no spurious transients result from the switching between these two modes of operation. Without the current path formed by resistors 42 and 43, switching of the bias current would produce a large transient which could be observed at 39 and 40. In addition, since bias current flows continuously from the power supply, rapid switching between states can be achieved.

It will be appreciated that the ability to place the preamplifier in a standby mode without introducing switching transients makes possible the introduction of a multiplicity of preamplifiers being fed from a multiplicity of paired elements in the computer memory. These preamplifiers may be connected in parallel to the linear amplifying transistors 33 and 34. Because of the bridge-type bias feed arrangement, the power dissipation is a constant value and does not depend on the condition of the input transistors. These additional transistors, which can be added in parallel with input transistors 31 and 32 to obtain a differential amplifier with N input channels, can be controlled to produce an output from the linear amplifier responsive only to the particular pair of transistors that have been biased. The resulting amplifier output will have N+1 operating states; one state resulting when bias is eliminated from all input transistors. FIG. 4 shown the addition of a second input in parallel with the first. This provides the second channel whose output can be alternately read out with the first channel. Additional transistors 44 and 45, fed respectively at B and B', are inserted for this purpose. A switch 46 is also provided to bias the transistor pairs 31,32 and 44,45 alternately. A third position shunts the bias current to ground.

What I claim is:

1. A memory sense amplifier comprising:
   a resistance bridge circuit having a pair of output corners and a pair of input corners;
   a source of potential voltage, one side of said source being connected to a reference potential and
      the other side of said source being connected to one of said input corners;
   a preamplifier,
      said preamplifier including a pair of transistors, each of said transistors having one terminal adapted to receive an input signal and a pair of energizing terminals across which a potential voltage must be applied to render each of said transistors operative,
         one energizing terminal of each transistor being connected to a different output corner of said bridge circuit,
         the other energizing terminal of each transistor being interconnected to form a common terminal; and
   means for connecting said common terminal or the other input corner of said bridge circuit to said reference potential.

2. Apparatus for selectively coupling the outputs of a number of the memory elements of a computer to an output circuit, comprising:
   a plurality of normally inactivated preamplifiers corresponding in number to said number of memory elements,
      each of said preamplifiers including a pair of transistors and each of said transistors having a pair of terminals across which a potential voltage must be applied to render them operative;
   means for coupling the input of each preamplifier to a different memory element output such that any signal appearing in the output of any memory element is subjected to preamplification when the preamplifier coupled thereto is activated;

means for coupling the output of each preamplifiers to said output circuit; and means for selectively activating only one of said preamplifiers at any one time, said last-mentioned means including a source of potential voltage, one side of said source being connected to a reference potential;

a resistance bridge having an input pair of corners and an output pair of corners;

means for connecting one of said input corners to the other side of said source means for connecting one terminal of each transistor of each pair to different output corners of said bridge;

means for interconnecting the other terminals of each pair of transistors so as to form a plurality of common terminals corresponding in number to the number of said preamplifiers; and means for connecting the different common terminals one at a time to said reference potential and for connecting the other of said input corners to said reference potential whenever none of said common terminals is connected to said reference potential, whereby the potential voltage at said one terminal of each transistor remains constant, thus eliminating any transient which may occur when said preamplifiers are selectively activated.

3. Apparatus for selectively amplifying the outputs of an number of computer memory elements comprising, in combination:

a plurality of normally inactivated preamplifiers corresponding in number to said number of elements, each of said preamplifiers having an input coupled to a different memory element output and including a pair of transistors, each of said transistors having a pair of terminals across which a potential voltage must be applied to render each of said transistors operative;

means for amplifying the outputs of all of said preamplifiers; and means for selectively activating only one of said preamplifiers at one time, said activating means including a source of potential voltage, one side of said source being connected to a reference potential;

a resistance bridge having an input pair of corners and an output pair of corners;

means for connecting one of said input corners to the other side of said source;

means for connecting one terminal of each transistor of each pair to different output corners of said bridge;

means for interconnecting the other terminals of said pair of transistors so as to form a reference potential terminal; and means for switching said reference potential to the reference potential terminal of that preamplifier which is to be activated or to the other input corner of said bridge when ever none of said preamplifiers are activated, whereby the potential voltage at said one terminal of each transistor remains constant, thus eliminating any transient which may occur when said preamplifiers are selectively activated.

4. The apparatus as recited in claim 3 further including; a buffer amplifier;

AC coupling means connected between the output of said amplifying means and the input of said buffer amplifier; and means for connecting the input of said buffer amplifier to said reference potential whenever none of said preamplifiers is activated.